United States Patent [19]

Hellstrom

[11] Patent Number: 5,346,354
[45] Date of Patent: Sep. 13, 1994

[54] CARRIAGE FOR TRANSFERRING OBJECTS

[76] Inventor: Nils Erik Hellstrom, Strandvagen 65, S-870 52 Nyland, Sweden

[21] Appl. No.: 974,045

[22] Filed: Nov. 10, 1992

Related U.S. Application Data

[63] Continuation-in-part of Ser. No. 634,866, Jan. 4, 1991, abandoned.

[30] Foreign Application Priority Data

May 30, 1988 [SE] Sweden .................. 8802007

[51] Int. Cl.$^5$ .................. B60P 3/035; B60S 13/00
[52] U.S. Cl. .................. 414/430
[58] Field of Search .................. 414/426–430; 244/50; 180/904

[56] References Cited

U.S. PATENT DOCUMENTS

| | | | |
|---|---|---|---|
| 2,252,534 | 8/1941 | Trotter | 414/428 |
| 2,380,415 | 7/1945 | Carruthers | 414/429 |
| 4,375,244 | 3/1983 | Morin | 414/429 X |
| 4,575,303 | 3/1986 | Lindell | 414/430 |
| 4,632,625 | 12/1986 | Schuller et al. | 414/429 |
| 4,655,670 | 4/1987 | Hogberg et al. | 414/426 X |
| 4,810,157 | 3/1989 | Schopf | 414/429 |
| 4,854,803 | 8/1989 | Coccaro | 414/429 |
| 4,911,603 | 3/1990 | Pollner et al. | 414/429 X |
| 4,950,121 | 8/1990 | Meyer et al. | 244/50 X |

FOREIGN PATENT DOCUMENTS

| | | |
|---|---|---|
| 8706542 | 11/1987 | World Int. Prop. O. |
| 8908583 | 9/1989 | World Int. Prop. O. .......... 414/426 |
| 89011983 | 12/1989 | World Int. Prop. O. .......... 414/462 |
| 9014266 | 11/1990 | World Int. Prop. O. .......... 180/904 |

*Primary Examiner*—David A. Bucci
*Attorney, Agent, or Firm*—Anderson Kill Olick & Oshinsky

[57] ABSTRACT

A steerable carriage for transferring wheeled vehicles includes a device for engaging in the carriage with a vehicle in a propulsion force transmitting manner and for elevating at least one wheel of the vehicle from a ground level, with the carriage transmitting a propulsion force to the vehicle through the engaging device and through the at least one elevated wheel of the vehicle, at least one support member on the engaging device arranged to be respectively movable to cause the wheel and the support member to assume a relative position in which at least a part of the wheel is located on the support member and is supported by the support member, at least one actuating a member on the engaging device, a chassis having at least one steerable wheel in its forward part, and legs on the chassis extending between the forward part and the engaging device, wherein said legs have an adjustable length to permit adjustment of a distance between the forward part of the chassis and the engaging device.

4 Claims, 6 Drawing Sheets

CARRIAGE FOR TRANSFERRING OBJECTS

FIELD OF INVENTION

This is a continuation-in-part of U.S. application Ser. No. 07/634,866, filed Jan. 4, 1991, now abandoned.

The present invention relates to a steerable carriage for transferring round objects, comprising a device for establishing a propulsion force transmitting engagement between the carriage and the object, wherein the object is primarily intended to be formed by a wheel of a vehicle and transfer of the wheel secured to the vehicle also giving rise to transfer of the vehicle.

BACKGROUND OF THE INVENTION

It is a difficult problem to transfer vehicles in premises for, e.g. sale and repair of vehicles. The combustion engines of the vehicles cause emission of exhaust gases hazardous to the health and cannot, therefore be used for transferring the vehicles unless specific devices are provided. Such devices normally comprise hoses connectable to the exhaust system of the vehicles, the exhaust gases being transported to the surroundings exteriorly of the premises via said hoses. However, these devices require very big investments and are principally used in large work shop premises, where it is required to allow the engines to run also during other time than during the transfer of the vehicles. Such exhaust gas evacuating devices are not applicable in car sale premises and the like due to the high investments and also due to aesthetical considerations. In order to avoid spreading of exhaust gases in car sale premises, one therefore presently tries to avoid as far as possible to have the engines running and transferring of the cars occurs manually. With other words, the car dealer has to, often assisted by the customer, pull and push respectively the car out of and into the premises when the customer wishes to make a test run. This work is extremely laborious and time consuming. Since the person having to steer the vehicle during the transfer carries out such steering through the door opening at the same time as he is pushing the vehicle, the control of the vehicle during the transfer deficient. Accordingly, there is a considerable risk for injuries and damage of other persons and cars present in the premises.

A number of various embodiments of steerable carriages for transferring vehicles are previously known per se. Rescue vehicles, wreckers, and the like may be mentioned as examples. However, the latter are not intended for the field of use primarily intended in this case, namely transfer of vehicles located indoors.

SUMMARY OF THE INVENTION

The object of the present invention is to provide a steerable carriage suitable for transferring objects and in particular vehicles, specifically indoors in, e.g. car sale premises or the like, said carriage having light weight and being readily operable for placing the vehicles relatively close side by side and at the same time the carriage should enable a good control of the vehicle during the transfer. However, it is also intended that the carriage should be suitable for transfer of objects other than vehicles.

This object is primarily obtained in accordance with the invention by providing a steerable carriage for transferring wheeled vehicles having a plurality of wheels, which comprises means for connecting the carriage to a wheeled vehicle in a propulsion force-transmitting manner, which connecting means includes at least one support member arranged to be relatively movable so that the wheel and the support member assume a relative position in which at least a part of the wheel is located on the support member and is supported by the support member, which has a substantially uniform position with respect to the ground during elevation of the wheel, and an upper support surface adapted to contact the wheel and sloping upwardly from a point relatively close to the ground to form an inclined plane. At least one actuating member is provided on the connecting means which member is adapted to actuate the wheel so that the wheel and the support member move relative to each other in order to move the wheel upwardly by rolling the wheel on the inclined support surface. By designing the carriage in this way a very simple arrangement for obtaining elevation of the object or the vehicle wheel is obtained. If the carriage is designed with an actuating member adapted to prevent the wheel from leaving its position on the support member during transfer of the carriage, a relatively small power requirement for the elevation is obtained due to the inclined surface of the support member.

Other advantageous embodiments of the carriage appear from the rest of the dependent claims.

BRIEF DESCRIPTION OF THE DRAWINGS

With reference to the enclosed drawings a more specific description of embodiment examples of the invention will follow hereinbelow.

DETAILED DESCRIPTION OF THE PREFERRED EMBODIMENTS

Figure 1:
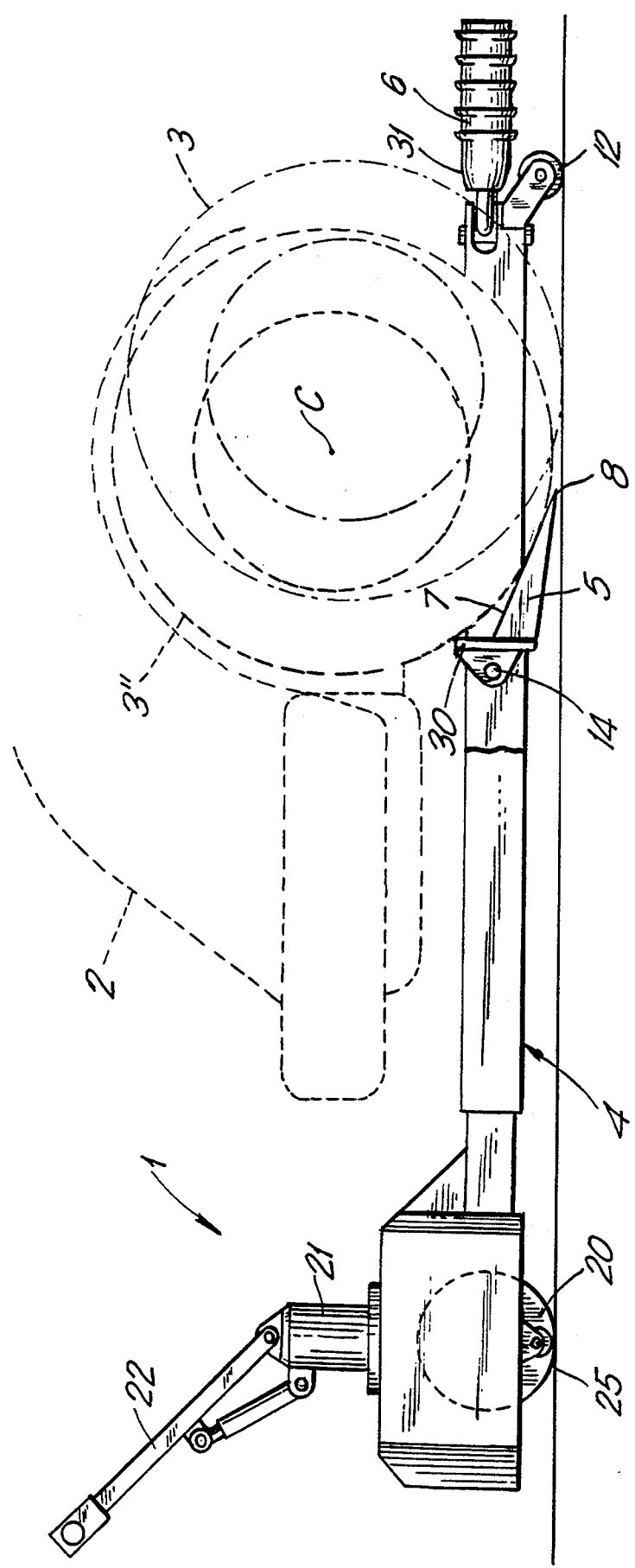
FIG. 1 is a diagrammatical, partly cut view of the carriage according to the invention illustrated in a side view, a part of a vehicle being indicated with dashed lines.
Figure 2:
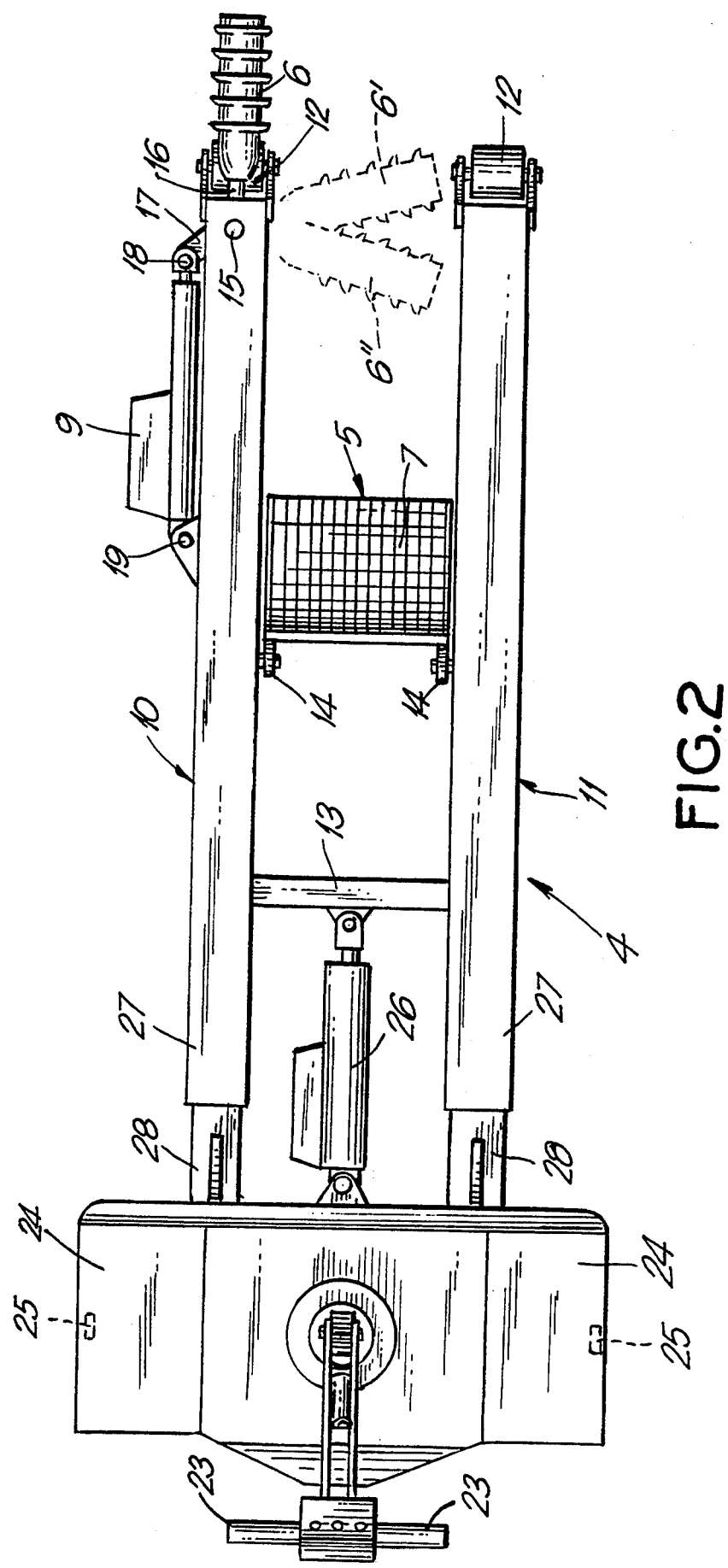
FIG. 2 is a plan view of the carriage according to claim 1.

The carriage according to FIGS. 1 and 2 comprises an engagement device generally denoted 1 for establishing a propulsion force transmitting engagement between the vehicle and the car 2 indicated with dashed lines. More specifically, the engagement device 1 is adapted to engage with and elevate a steerable wheel 3, i.e. normally a front wheel, of the car from the ground. Furthermore, the carriage is adapted to transmit propulsion force, on transfer of the carriage, to the car 2 via the engagement device 1 and via said wheel 3. The carriage and its wheel engagement device 1 are adapted to leave the other wheels of the car free from direct actuation and free to roll against the ground in question during the transfer.

The engagement device 1 provided on the chassis 4 of the carriage comprises a support member 5 and an actuating member 6 movably arranged on the chassis, said actuating member being adapted to cause the wheel 3 and support member 5, by acting on the wheel, to assume such a relative position, in which the wheel 3 is at least partially located on the support member 5 and at least partly supported thereby. The support member 5 has an upper surface 7, which is intended to contact the wheel and which from a place 8 relatively close to the ground slopes upwardly. The support surface 7 forms an inclined plane.

The actuating member 6 is adapted to actuate wheel 3 so that the latter and the support member 5 move mutually whereas the wheel is effected upwardly out of contact with the ground by the inclined surface 7. In FIG. 1 the wheel is indicated with the designation 3 and with dash dotted lines in a position; resting on the ground whereas the wheel with the designation 3 and dashed lines is indicated to be elevated on the inclined surface 7 of support member 5.

The actuating member 6 is adapted to prevent wheel 3 from leaving its position on support member 5 during transfer of the carriage. As will be discussed more closely hereinafter, it is suitable that the actuating member 6 is formed by a rotatably journalled roller and furthermore, it is suitable that the actuating member is pivotably journalled on the chassis 4 of the carriage.

The actuating member 6 is by means of a power member 9, which preferably is of a type variable in length, movable from an inactive position appearing with solid lines in FIG. 2 and also from FIG. 1, in which the actuating member allows the wheel 3 and support member 5 to be located close to each other with the peripherical surface of the wheel adjacent to the support member, to an active area of movement, in which two possible positions are indicated in FIG. 2 with dashed lines at 6' and 6" and in which the actuating member actuates the wheel 3 to its position on the support member and retains the wheel thereon.

The chassis 4 of the carriage comprises two legs 10, 11, which are arranged at a mutual distance to be able to be located in a position, wherein the legs are located on either sides of the wheel 3 of the vehicle. The support member 5 is arranged between the legs 10, 11 as viewed from above and furthermore, the actuating member 6 is arranged to entirely or partially block the interspace between the legs adjacent to the free ends of the legs and thereby prevent exit of the wheel from its position between the legs.

The legs 10, 11 comprise at their extreme ends support wheels 12 for rolling engagement with the ground and are interconnected by means of a transverse beam 13. The support member 5 is in the embodiment pivotably connected to the chassis of the carriage 4, and more specifically its legs 10, 11, about a generally horizontal axis, which in this case is formed by two pivot pins 14 projecting through holes in brackets secured to the support member. The latter is by means of arbitrary stop members, not illustrated, prevented from pivoting clockwise in FIG. 1, but on the other hand, the support member may pivot anti-clockwise, which is an advantage if the support member would hit any hindrance, e.g. a threshold, on the ground. In order to obtain a gentle pivoting of the support member upwardly in such a situation, its lower surface should preferably slope downwardly and rearwardly as indicated in FIG. 1.

The upper inclined surface 7 of the support member is preferably provided with rifling extending parallel to the direction of inclination, i.e. parallel to the plane of the wheel 3 and these riflings have the purpose to counteract sliding sidewardly of the wheel on the support surface 7.

It is preferred that the actuating member 6 is movable in a generally horizontal plane. The actuating member is preferably pivotable and its pivot axis is denoted 15. The actuating member 6 designed as a roller is freely rotatably journalled but axially undisplacable relative to an axis 16, which in turn is pivotable about axis 15. A sleeve, which rotatably surrounds the axis 15, may e.g. be rigidly secured to axis 16. To this sleeve there is rigidly secured a lever 17, to which one end of the power member 9 is pivotably attached at 18. The other end of power member 9 is pivotably connected at 19 to a bracket relative to the chassis of the carriage. This bracket as well as axis 15 are secured to one leg 10 of the chassis of the carriage. On extensioning of the power member 9 the actuating member 6 will be pivoted from the inactive position illustrated with solid lines in FIG. 2 to its active area of movement, in which the actuating member is in engagement with the wheel. It is preferable that the power member 9 is of the type which comprises means controlling the power member to cease its operation as soon as the power member experiences a resistance exceeding a certain predetermined level. Furthermore, it has been found suitable that the power member 9 is of the type comprising a screw-nut device driven by an electric motor, although of course also other types of power members may be used.

At its forward portion, the chassis 4 of the carriage comprises at least one steerable wheel 20. This is connected to a carrier 21 pivotable in the forward part of the chassis about a vertical axis; a steering lever 22 with handle 23 being connected to said carrier. An operator walking on the ground may accordingly hold in the handles 23 and by means of guiding lever 22 rotate carrier 21 and accordingly wheel 20 so that the direction of movement of the carriage may be changed. Furthermore it is preferred that the wheel 20 is driven by a motor, suitably an electrical motor, so that the operator need not produce any movement or transfer forces but only has to steer the carriage in the desired direction. Such a motor may be arranged for driving the wheel 20 in an arbitrary manner known per se, it being particularly suitable to incorporate the motor into the hub of the wheel. The casing-like forward part of the chassis comprises portions 24 for accommodating accumulators for delivering electrical current to the current consuming components of the carriage. Support wheels 25 may preferably be arranged on either sides of the forward steerable wheel 20 of the carriage, said support wheel 25 normally being located above the ground but entering into supporting function against the ground on tendency of lateral inclination of the carriage.

It is preferred that the length of the legs 10, 11 is adjustable, e.g. by means of a power member 26. More specifically, the legs 10, 11 may be of a telescoping design with two projectable telescope parts 27, e.g. tubular parts, and two telescope parts 28, e.g. intended to be received within parts 27, secured to the forward chassis part. The power member 26 is preferably of a similar type as that previously described and denoted 9 and has one of its ends acting on a point of attachment relative to the transverse beam 13 between the telescope parts 27 and a point of attachment relative to the forward chassis part of the carriage. By extending and contracting power member 26, the length of the legs 10, 11 may accordingly be varied. This is suitable since the length of legs 10, 11 in order to obtain good maneuverability should be as short as possible but nevertheless cars having a large length ahead of the forward wheels may make it necessary to make the legs 10, 11 obtain a large length.

Operating members for controlling the power members 9 and 26 and for controlling the motor driving the wheel 20 are preferably arranged on the steering lever 22.

The support member 5 comprises suitably an upwardly projecting portion 30 adapted to form a stop for the movement of the wheel 3 forwardly on the support member by contacting the wheel.

Since the actuating member 6 describes a pivoting movement, its portion located most closely to the pivot axis 15 will initially enter into contact with the tire of the wheel 3. Therefore, it is suitable that the portion of the actuating member 6 located most closely to axis 15 tapers in the directions towards axis 15 as indicated at 31. The tapering may suitably take place with a rounded form. To avoid that the wheel 3 of the car slides along the actuating member 6 it is suitable to provide the same with peripherical projections and/or recesses orientated perpendicularly to the axis of rotation of the actuating member. In the embodiment it is indicated that basically projections can be said to be at hand and it is preferred that these projections have flanks, the flanks located closest to the pivot axis 15 sloping away from this pivot axis since thereby a lenient contact with the tire of the wheel 3 is obtained.

The carriage described functions in the following way: when a car is to be transferred, the carriage is maneuvered with the actuating member 6 in its inactive position so that a car wheel, preferably a steerable front wheel, becomes located between legs 10 and 11 adjacent to the place denoted 8 of the support member 5. The power member 9 is then activated so that the actuating member 6 is pivoted inwardly between legs 10, 11. The actuating member 6 thereby contacts the tire of the wheel 3 and presses on the wheel so that it moves up on the inclined surface 7 of the support member 5. When the tire of the wheel reaches the stop member 30 such a great resistance against additional pivoting of the actuating member 6 is obtained that the operation of power member 9 is interrupted and the power member then maintains the length state achieved so that the actuating member 6 remains in contact with the wheel 3 and in co-operation with support member 5 keeps the same elevated. The rotatable design of the actuating member 6 causes the same to be able to rotate while in contact with the wheel 3. The final position of the actuating member 6 will depend from the actual diameter of the wheel 3; normally, the actuating member 6 will, in the elevated position of the wheel, be located in a position between those denoted 6' and 6" in FIG. 2. The operator may thereafter initiate the driving of wheel 20 so that the carriage, while bringing with it the wheel 3 and accordingly the car, may be moved freely whereas the operator steers and controls the carriage in the desired manner by means of the steering lever 22.

It should be pointed out that if the car 2 would present a greater inertia against movement than the carriage, the lifting operation will primarily proceed so that the contact of the actuating member 6 with the wheel of the car causes the support member 5 to be pushed in under the wheel 3. If the car would tend to roll more easily than the carriage or if the latter would be braked, the operation could also be such that the wheel 3 of the car is actuated to roll up on the inclined surface 7 of the support member by the actuating member 6. A combination of these operations may also occur.

Figure 3:
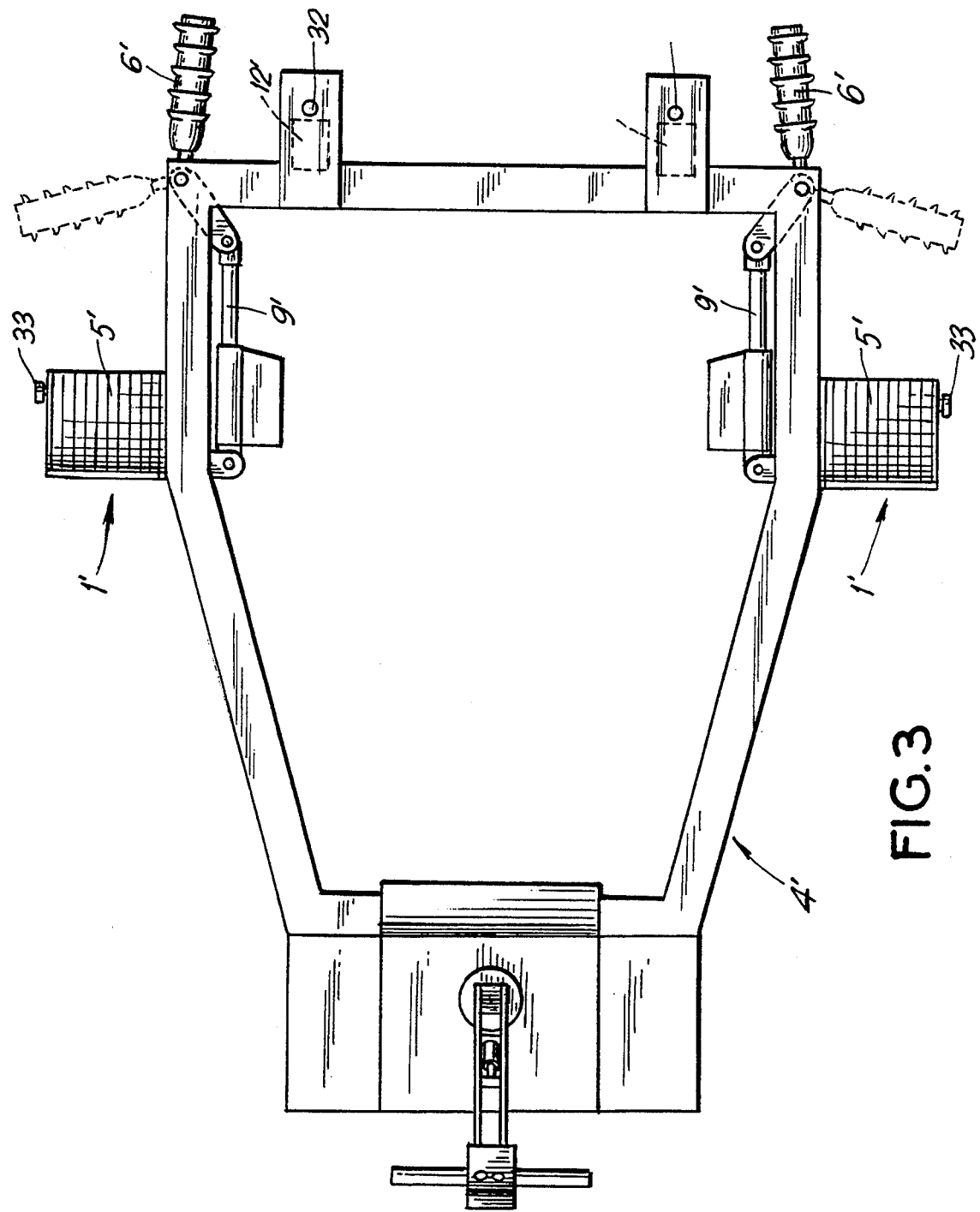
FIG. 3 is a plan view of a slightly modified carriage.

The variant of the carriage illustrated in FIG. 3 has the major difference relative to the embodiment described that the engagement device 1' here comprises two support members 5' and two actuating members 6' operated by power members 9' and adapted for simultaneous elevating co-operation with two wheels, preferably the two steerable front wheels, of the car or vehicle in question. The entire forward portion of the vehicle is accordingly intended to be elevated. The chassis 4 of the carriage has in this case for natural reasons a different and wider structure and the support members 5' projects sidewardly from the chassis 4'. Furthermore, it is suitable that the rear support wheels 12' are freely pivotably journalled about axes 32. The support members 5' may be rigidly secured to the chassis 4' or as in the previous embodiment pivotable about shafts analogous to the one denoted 14 in FIGS. 1 and 2. In both cases it may be suitable to arrange supporting wheels 33 on the support members 5', said supporting wheels being intended to enter into contact with the ground for supporting purposes if there would be a tendency to lateral inclination of the chassis 4. Alternatively, also these support wheels 33 could roll permanently on the ground if so desired.

The carriage described involves the major advantage that the lifting of the wheel in question of the vehicle occurs extremely efficiently with a small power requirement due to the design of the support members 5, 5' with the inclined upper surface 7.

As appears from FIG. 1, the device is so designed that the contact surface of the actuating member 6, in the elevated state of the wheel 3, relative to the wheel is located at a higher level than the contact surface of the support member 5 relative to the wheel. In other words, a vertical plane extending through the center C of the wheel and parallel to its center axis will, in the elevated state of the wheel 3, be located more closely to the contact surface of the support member 5 relative to the wheel than the contact surface of the actuating member 6 relative to the wheel. Accordingly, the consequence is that the support member 5 and actuating member 6 are so mutually arranged that in the elevated state of the wheel, the main part of its weight and the main part of the load of the vehicle acting on the wheel will be assumed by the support member 5. In other words, the actuating member 6 will in the elevated state of the wheel be subjected to a relatively small proportion of the gravity of the wheel and vehicle so that the actuating member 6 generally will fulfill the task to prevent the wheel from rolling down from the support member 5. The part of the inclined support surface 7 located most closely to the ground is accordingly situated under the portion of the actuating member 6 intended for contact with the wheel or object 3 so that the object with a relatively small power requirement may be rolled up onto the support surface. The inclination of the support surface is not more than 45 relative to a horizontal plane, suitably smaller than 30 and preferably smaller than 25 .

The carriage described may, of course, be modified in several ways in relation to the variants described. In these variants the actuating members 6, 6' are intended to actively take part in maintaining vehicle wheels elevated. However, it would be conceivable to modify the support member 5 so that the vehicle wheels entirely or almost entirely are maintained elevated thereby during transfer by means of the carriage so that accordingly the actuating members during such transfer will not be subjected to any strains at all or possibly only small strains. Finally, it should be pointed out that it would be possible to modify the variants described so that the actuating member 6, 6' would be arranged to assume one and the same active position during the lifting operation and instead, the support member 5 with its inclined upper surface 7 could be designed movable relative to the chassis of the carriage so that the support member would be pushed in under the vehicle wheel whereas the latter would be abutting against the actuating member, which would be stationary apart from its possible rotational ability. In such a design, the actuating member would primarily have the character of abutment against the wheel. Also other modifications of the carriage are possible within the scope of the invention.

It is specifically pointed out that if the vehicle to be lifted by means of the carriage in FIGS. 1 and 2 have two steerable wheels arranged in parallel and one of these wheels is lifted by means of the carriage, steering movements of the carriage will be transferred to the other steerable wheel rolling against the ground via the lifted wheel and the steering mechanism of the vehicle. Accordingly, the steering movements of the vehicle will be limited to the steering ability (turning radius) of the vehicle, a condition being that the vehicle is so arranged that its steering movements are transferred to the lifted vehicle wheel. On the contrary, in the embodiment according to Fig 3 elevation of two wheels of the vehicle will cause its forward (or alternatively rear) end to be entirely elevated and accordingly, the steering movement of the carriage will not be limited by the steering mechanism of the vehicle.

Figure 4:
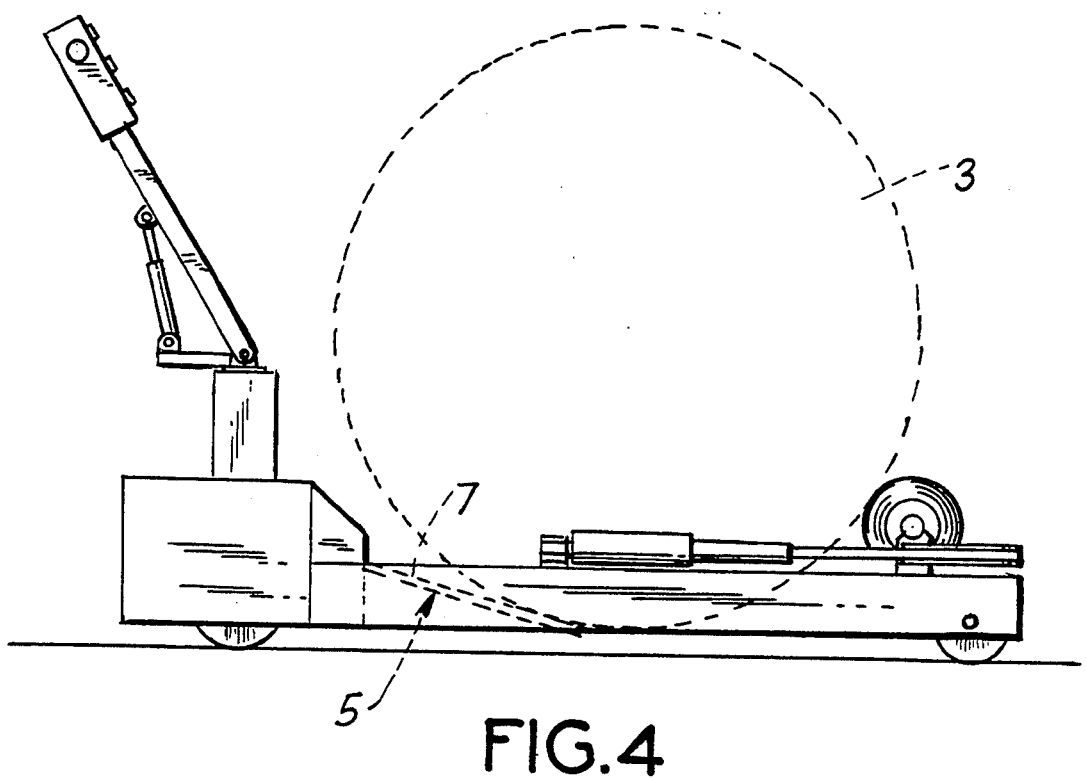
FIG. 4 is a side view of a carriage for transferring round objects in the form of e.g. paper rolls.
Figure 5:
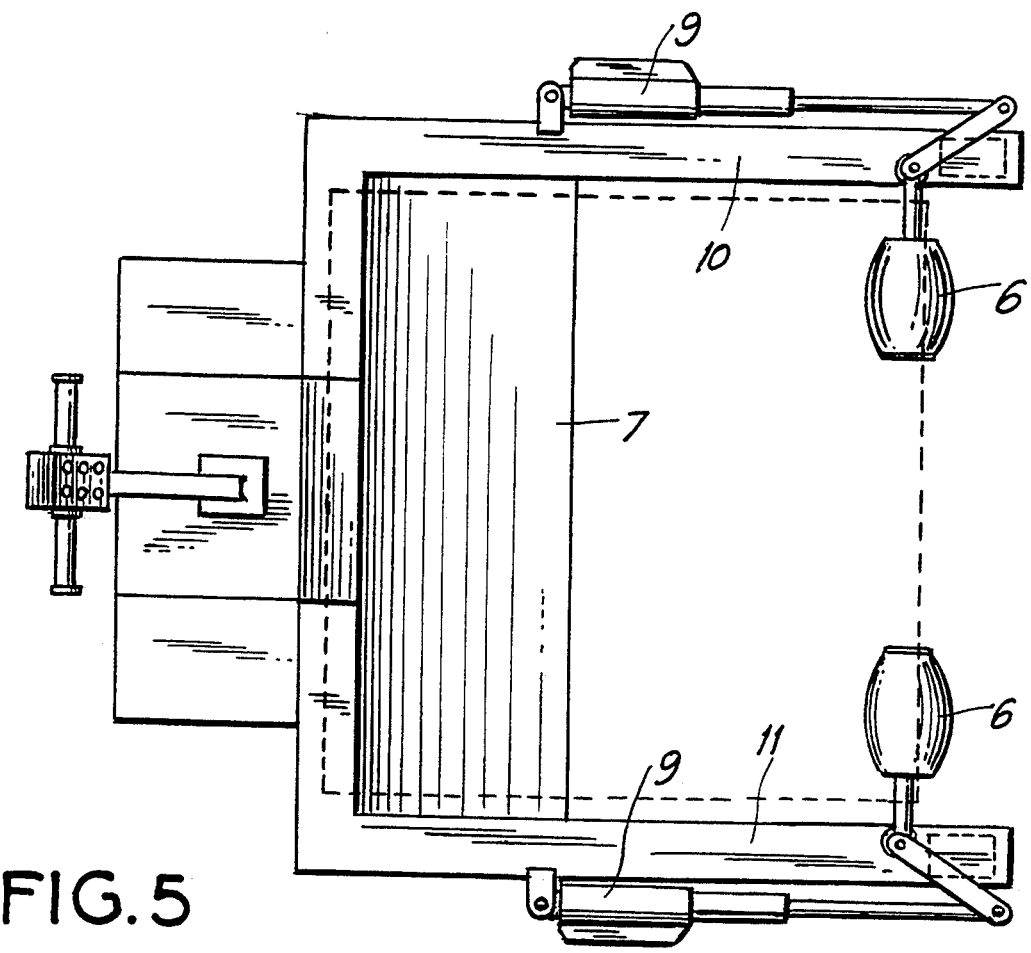
FIG. 5 is a plan view of the carriage according to FIG. 4.

The carriage variant illustrated in FIGS. 4 and 5 is intended for transfer of other round objects, e.g. paper rolls, than vehicle wheels and associated vehicles. The carriage according to FIGS. 4 and 5 corresponds in its main features with the carriage already described and only the main differences will be mentioned herein. As previously, the carriage comprises two legs 10, 11, which are arranged at a mutual distance and between which the paper roll or object is intended to be received. The distance between the legs is here greater and adjusted to the length of the object. As previously, the carriage comprises a support member 5 having an upper support surface forming an inclined plane 7. In this variant, two actuating members 6 are pivotably arranged by means of power members 9 for actuating the paper roll to roll up onto the inclined plane 7. Each of the legs 10, 11 comprises an actuating member pivotably journalled at the extreme end thereof, said actuating member being connected to a lever in turn connected to the respective power members.

Figure 6:
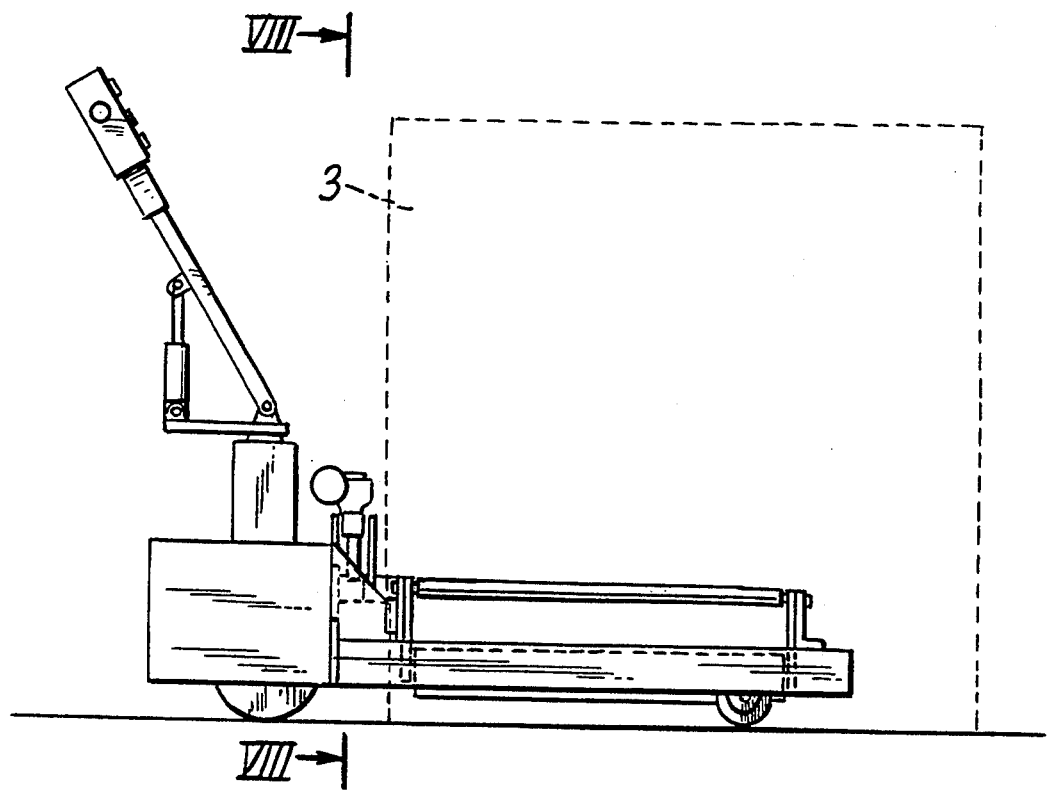
FIG. 6 is a side view of a variant of the embodiment according to FIG. 4.
Figure 7:
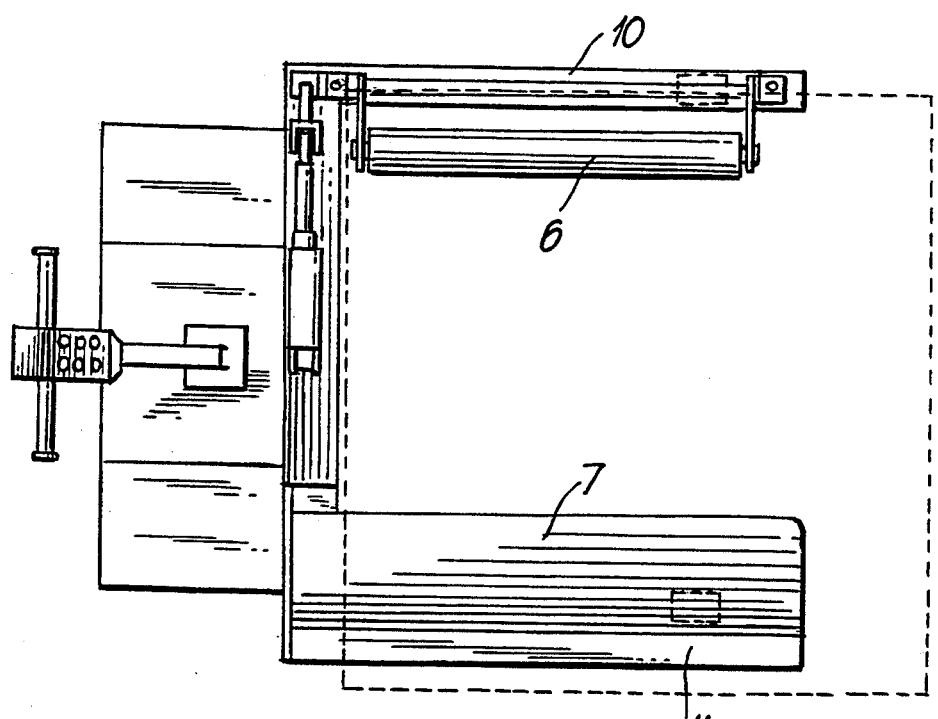
FIG. 7 is a plan view of the carriage according to FIG. 6.

In the embodiments previously described, the objects or wheels have been received between the legs of the carriage so that the axes of the objects or wheels extend generally perpendicularly to the legs. In the variant in FIGS. 6–8 and also intended for round objects in the form of e.g. paper rolls, the paper roll is adapted to be received between the spaced legs 10, 11 of the carriage with the roll axis generally parallel to the longitudinal direction of these legs. Also here there is a support member 5 having a support surface 7 forming an inclined plane and this support member 5 extends along one leg 11 of the carriage. On the other leg 10 of the carriage an actuating member 6, here designed as an elongated roller, is movably arranged between the positions indicated in solid and in dashed lines by means of a power member 9. More specifically, the actuating member is arranged at the extreme end of pivoting arms 16. As appears from FIG. 7, the actuating member 6 is elongated and it extends generally parallel to leg 10.

Figure 8:
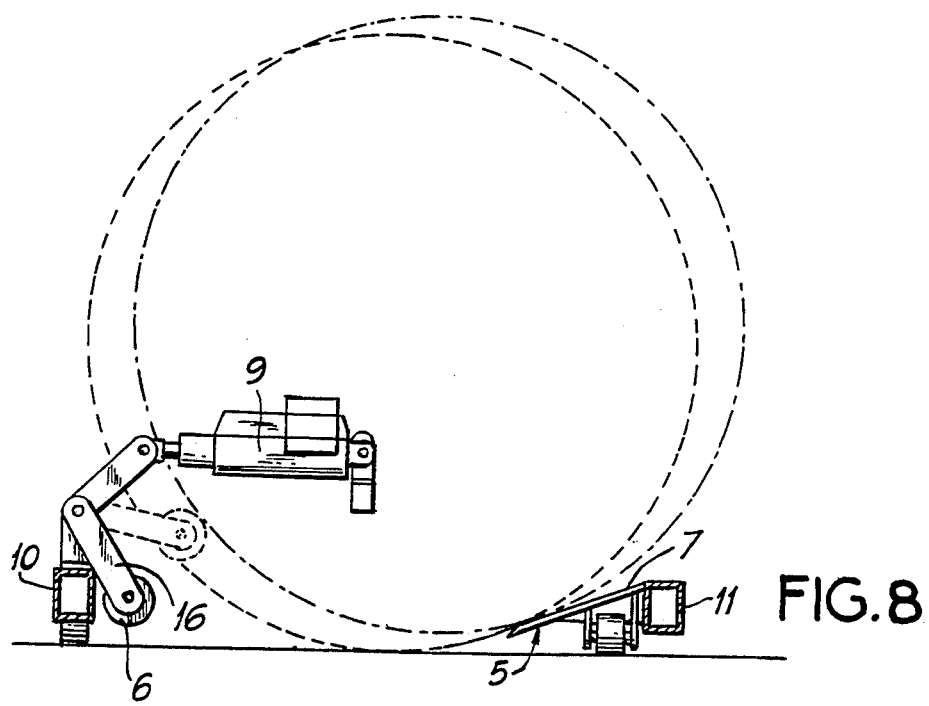
FIG. 8 is a section along the line VIII—VIII in FIG. 6.

With the actuating member 6 in the position illustrated with solid lines according to FIG. 8, the carriage can be located with its legs 10, 11 on either sides of the round object. By pivoting the actuating member 6 towards the dashed position by means of the power member 9, the object is displaced by rolling up onto the inclined support surface 7. During this rolling, the relative direction of displacement between the object and the carriage is directed generally transversely to the longitudinal directions of the legs 10, 11, whereas in the previous embodiments the corresponding relative direction of displacement was generally parallel to the legs of the carriage.

Figure 9:
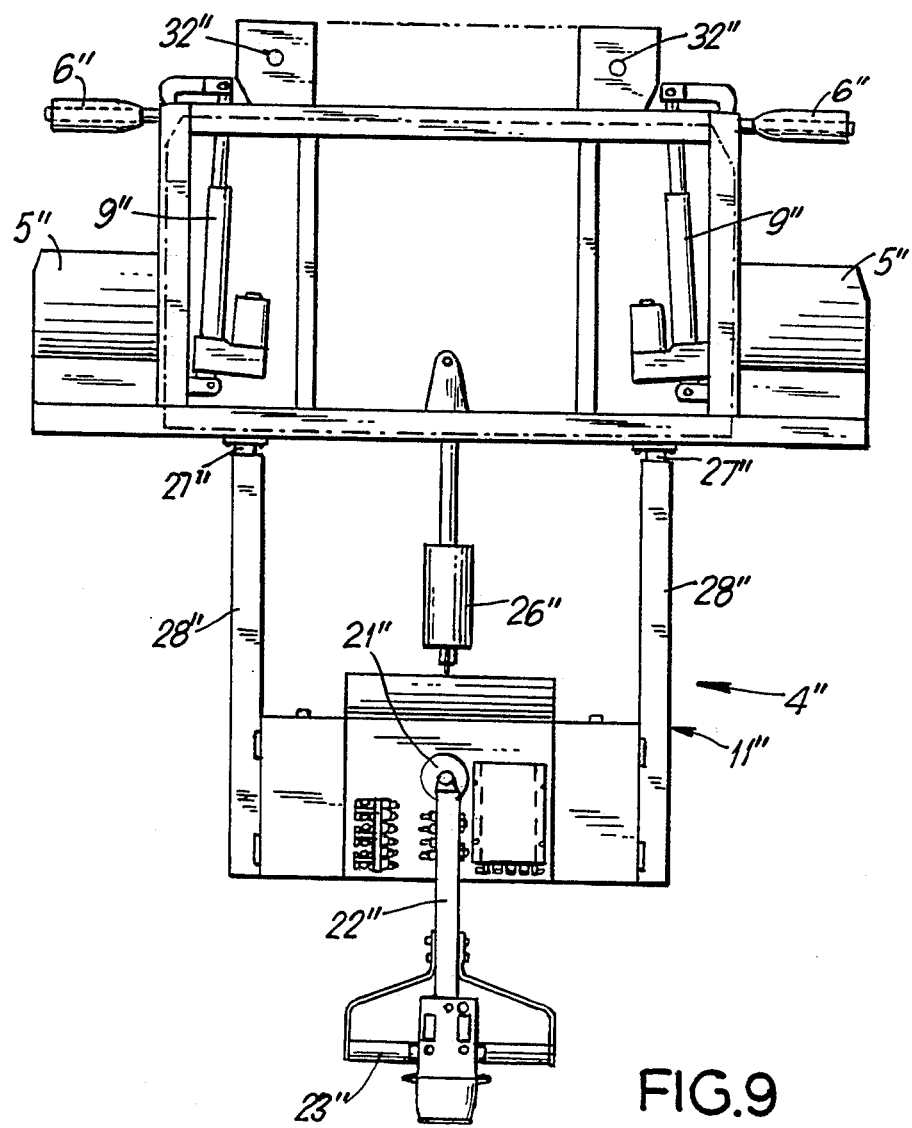
FIG. 9 is a plan schematic view of the carriage similar to the embodiment disclosed in FIG. 3, but including the telescopically extendable shanks as in the embodiment already shown in FIGS. 1 and 2.

In the embodiment disclosed in FIG. 9, which is substantially similar to the one disclosed in FIG. 3, the carriage also comprises a chassis 4" having a rear part comprising two support members 5" and two actuating members 6" operated by power members 9". The support members 5" are adapted for simultaneous elevating co-operation with two wheels, preferably the two steerable front wheels of a car. The entire forward portion of the vehicle is, accordingly, intended to be elevated. As in FIG. 3, the support members 5" projected sidewardly from the rear part of the chassis 4". Rear support wheels are freely pivotally journalled about axes 32". The actuating members 6" are pivotally arranged at the chassis 4" as before.

As its forward portion, the chassis 4" of the carriage comprises at least one steerable wheel, which is connected to a carrier 21" and is pivotable in the front part of the chassis about a vertical axis. A steering lever 22" with handle 23" is connected to the carrier 21". An operator may rotate the carrier 21" and thereby the steerable wheel by turning the steering lever 22".

Legs 10" and 11" of the chassis 4" extend between the forward and rear parts of the chassis. The legs have an adjustable length to permit adjustment of a distance between the forward part of the chassis and the support members 5". It is preferred that the legs 10" and 11" have a telescoping design. More specifically, the legs comprise two projectable telescope parts 27" and two telescope parts 28" arranged to be in engagement with the projectable parts and secured to the forward part of the chassis 4".

A length-variable power member 26" acts between the telescope parts 27" and 28" of the legs 10" and 11".

What is claimed is:

1. A steerable carriage for transferring wheeled vehicles, comprising:
    means for engaging the carriage with a vehicle in a propulsion force transmitting manner, and for elevating at least one wheel of the vehicle from a ground level, said carriage being arranged to transmit a propulsion force to the vehicle through said engaging means and through said at least one elevated wheel of the vehicle;

at least one support member on said engaging means arranged to be respectively movable to cause the wheel and the support member to assume a relative position in which at least a part of the wheel is located on the support member and is supported by the support member;

at least one actuating member on said engaging means;

a chassis having at least one steerable wheel in a forward part thereof; and legs on said chassis extending between the forward part and said engaging means, wherein said legs have an adjustable length to permit adjustment of a distance between the forward part of the chassis and said engaging means.

2. The carriage of claim 1, wherein said legs are of a telescoping design.

3. The carriage of claim 2, wherein said legs, comprise:

two projectable telescope parts; and two telescope parts arranged to be in engagement with said projectable parts and secured to the forward part of the chassis.

4. The carriage of claim 3, wherein a power member of a type variable in length is arranged to act between the telescope parts of the legs.

* * * * *